United States Patent
Ammar et al.

(10) Patent No.: US 9,321,395 B2
(45) Date of Patent: Apr. 26, 2016

(54) VEHICLE PUDDLE LAMP ASSEMBLY GENERATING ANIMATED IMAGE AND METHOD

(71) Applicant: Ford Global Technologies, LLC, Dearborn, MI (US)

(72) Inventors: Ali Ammar, Dearborn, MI (US); Cornel Lewis Gardner, Romulus, MI (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 13/871,065

(22) Filed: Apr. 26, 2013

(65) Prior Publication Data

US 2014/0320823 A1    Oct. 30, 2014

(51) Int. Cl.
| | |
|---|---|
| *F21V 5/00* | (2015.01) |
| *B60Q 1/24* | (2006.01) |
| *B60Q 1/26* | (2006.01) |
| *B60R 1/12* | (2006.01) |

(52) U.S. Cl.
CPC ............. *B60Q 1/24* (2013.01); *B60Q 1/2665* (2013.01); *B60R 1/12* (2013.01); *B60Q 2400/40* (2013.01); *B60Q 2400/50* (2013.01)

(58) Field of Classification Search
CPC ..................................... F21V 5/00; F21V 7/04
USPC .................................................. 353/2, 13, 95
See application file for complete search history.

(56) References Cited

U.S. PATENT DOCUMENTS

| | | | |
|---|---|---|---|
| 6,152,590 A * | 11/2000 | Furst et al. ................ 362/545 |
| 6,685,347 B2 | 2/2004 | Grutze | |
| 6,902,305 B2 | 6/2005 | Wainwright | |
| 7,175,321 B1 | 2/2007 | Lopez | |
| 2002/0159741 A1 | 10/2002 | Graves et al. | |
| 2005/0117364 A1 | 6/2005 | Rennick et al. | |
| 2006/0104075 A1 * | 5/2006 | Misawa .................... 362/501 |
| 2008/0285293 A1 | 11/2008 | Sato | |
| 2009/0115639 A1 * | 5/2009 | Proefke et al. ............. 340/989 |
| 2010/0253919 A1 | 10/2010 | Douglas | |
| 2010/0277696 A1 * | 11/2010 | Huebner ..................... 352/81 |
| 2010/0321945 A1 * | 12/2010 | Lang et al. ................. 362/501 |
| 2010/0321946 A1 | 12/2010 | Dingman | |
| 2011/0128141 A1 | 6/2011 | Purks et al. | |
| 2011/0273671 A1 | 11/2011 | Chu | |
| 2012/0280528 A1 * | 11/2012 | Dellock et al. ........... 296/1.08 |

OTHER PUBLICATIONS

"SRT LED Door Light Projector," www.mrkustom.com, Mr. Kustom Chicago, Copyrighted 2012, 7 pages.
"2008, 2009, 2010, 2011, 2012 Challenger MPAR Door Light Projector," www.northamericantuning.com, Cpyrighted 2012 North American Tuning LLC, 7 pages.

* cited by examiner

*Primary Examiner* — William C Dowling
*Assistant Examiner* — Jerry Brooks
(74) *Attorney, Agent, or Firm* — Jason Rogers; Price Heneveld LLP (57) ABSTRACT

A vehicle puddle lamp assembly is provided and includes a plurality of light projectors located on a vehicle and configured to illuminate different lighted image patterns on a ground surface adjacent to the vehicle. The vehicle puddle lamp assembly also includes a controller for sequentially activating the plurality of light projectors to generate an animated lighted image on the ground surface.

19 Claims, 7 Drawing Sheets

VEHICLE PUDDLE LAMP ASSEMBLY GENERATING ANIMATED IMAGE AND METHOD

FIELD OF THE INVENTION

The present invention generally relates to vehicle lighting, and more particularly relates to a vehicle puddle lamp assembly for providing an illuminated image on the ground surface adjacent to the vehicle.

BACKGROUND OF THE INVENTION

Automotive vehicles are increasingly employing lighting devices such as puddle lamps for enhanced lighting applications. Puddle lamps have been employed to illuminate a beam of light onto the ground surface in an area adjacent to the vehicle door when the door is to be opened. The puddle lamp thereby provides illumination to a driver or passenger of the vehicle to observe the area for approaching or stepping out of the vehicle, such as the existence of a puddle of water.

SUMMARY OF THE INVENTION

According to one aspect of the present invention, a vehicle puddle lamp assembly is provided. The vehicle puddle lamp assembly includes a plurality of light projectors located on a vehicle and configured to illuminate different lighted image patterns on a surface adjacent to the vehicle. The vehicle puddle lamp assembly also includes a controller for sequentially activating the plurality of light projectors to generate an animated lighted image on the surface.

According to another aspect of the present invention, a method of generating an animated lighted image with a vehicle puddle lamp assembly is provided. The method includes the steps of receiving a signal to activate a vehicle puddle lamp and sequentially activating a plurality of light projectors configured to illuminate different light patterns on a surface adjacent to the vehicle to generate an animated lighted image.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
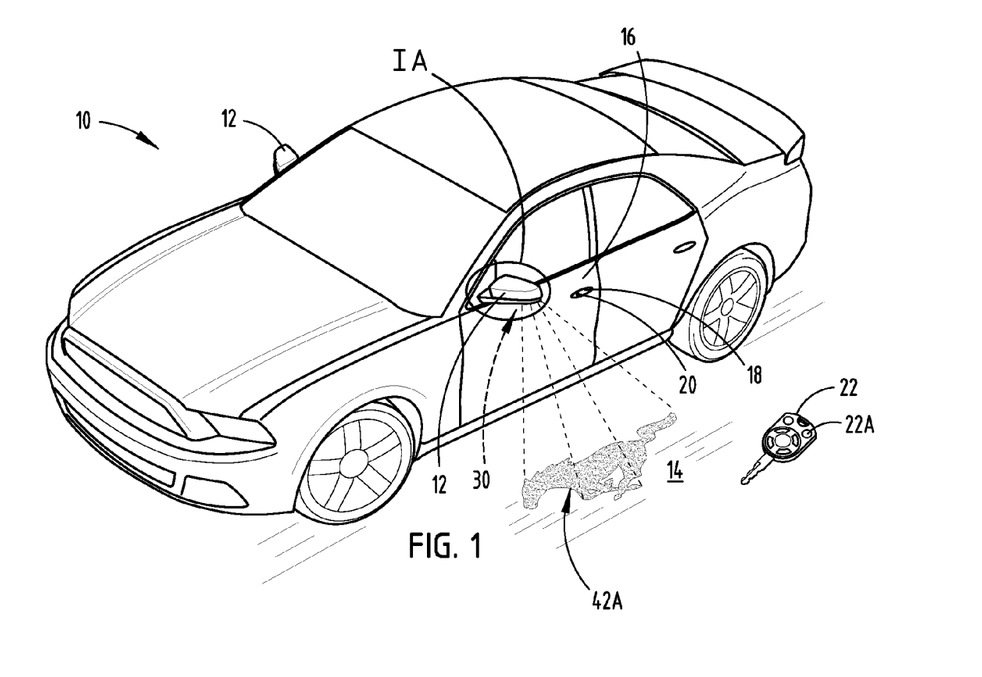
FIG. 1 is a perspective view of an automotive vehicle employing a puddle lamp assembly in an exterior side view mirror of a vehicle, according to one embodiment.
Figure 1A:
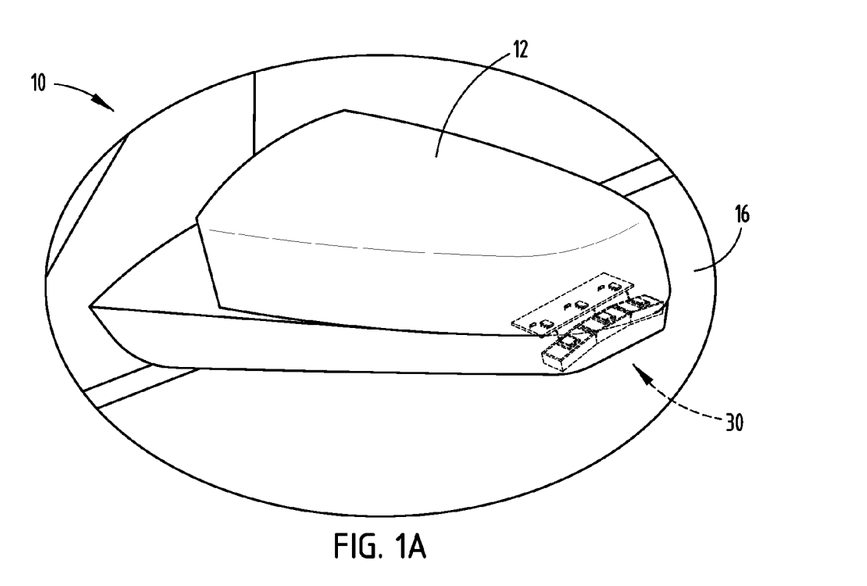
FIG. 1A is an enlarged view of section IA illustrating the exterior side view mirror with a plurality of light projectors employed by the lamp assembly.

Referring to FIGS. 1 and 1A, an automotive vehicle 10 is generally illustrated employing a vehicle puddle lamp assembly 30, according to one embodiment. The vehicle 10 shown is one example of a passenger vehicle having a pair of exterior rearview mirrors 12 mounted on opposite lateral sides of the vehicle generally near the front side of the front passenger doors 16, as is generally known in the art. Passenger doors 16 each include a handle 18 with a latch mechanism to enable a user to engage and unlatch the latch mechanism to open the door for access to enter and exit the vehicle. A remote key fob 22 is shown which may be operated by a user to activate various features including door lock and unlock functions. The handle 18 is showing including a proximity sensor 20, such as a capacitive sensor, for sensing the hand of the user in close proximity to the handle 18.

The vehicle puddle lamp assembly 30 is shown installed on an exterior rearward facing side view mirror 12, generally in a position configured to project an animated lighted image onto the ground surface 14 adjacent to a passenger side door of the vehicle 10. The lamp assembly 30 includes a plurality of light projectors located on the vehicle shown in one embodiment installed in the lower housing of the mirror 12. In the embodiment shown, three light projectors are configured in a linear array, each oriented to illuminate a different lighted image on the same general area of the ground surface 14. While three light projectors are shown and described herein as part of the puddle lamp assembly, it should be appreciated that two or more light projectors may be employed in various configurations and orientations. It should further be appreciated that the light projectors may be located at different locations on the vehicle such as in the vehicle door handle, the door itself, a side fender, a bumper, a roof rail or other locations sufficient to project a lighted image onto the ground surface 14.

The vehicle puddle lamp assembly 30 is controlled by a controller to sequentially activate the plurality of light projectors consecutively one at a time such that a corresponding lighted image pattern is output from each projector and projected onto the ground surface 14 one at a time at a sufficiently rapid rate to generate an animated lighted image which has the appearance of a moving image. In the specific example shown and described herein, an image of a mustang 42A which may be a logo and may serve as a trademark is shown in three different lighted image patterns in which the legs of the mustang appear to move due to the sequential and rapid consecutive activations of the three light projectors. It should be appreciated that other images having different patterns, sizes, and light colors may be generated.

The puddle lamp assembly 30 may be activated in response to a user activating the door unlock switch on the key fob 22 when the user is within signal communication range of the vehicle 10. Upon activation of the door unlock switch or button, the vehicle puddle lamp assembly 30 is turned on to generate the animated lighted image, such as the running mustang. The lamp assembly 30 may remain on for a predetermined time period, such as two minutes, and may be turned off prior to the predetermined time period when a user's hand is detected by the proximity sensor 20 in close proximity to or actuating the door handle 18. Accordingly, the appearance of the moving lighted image provides an animated lighted image and serves as a puddle lamp to illuminate the ground surface 14 adjacent to the vehicle door to enable the user to approach and access the vehicle 10 and view the ground surface 14 proximate thereto.

Referring to FIGS. 2A-4C, the lamp assembly 30 is further illustrated having three light projectors 32A-32C for generating three different lighted image patterns 42A-42C. The lamp assembly 30 includes first light projector 32A, second light projector 32B and third light projector 32C, all shown arranged in a linear array and slightly angled relative to one another so as to provide light illumination onto the same general area on the ground surface 14. Each of the light projectors includes a housing 34A-34C, a light source 36A-36C, such as a light emitting diodes (LEDs), and an image filter 38A-38C. The image filters 38A-38C are arranged within the light output windows of the corresponding light sources 36A-36C, respectively, such that light output by the light sources 36A-36C is illuminated onto and passes through the image filters 38A-38C one at a time to provide the lighted image patterns 42A-42C projecting onto the ground surface 14. The image filters 38A-38C may include a light transparent film having either a positive or negative light transparent image. Additionally, the lamp assembly 30 is shown having a printed circuit board containing a controller having control circuitry including LED drive circuitry for controlling activation and deactivation of the light sources and hence the light projectors 32A-32C. The LEDs and filters generate a visible light such as white light or other color(s).

Figure 2A:
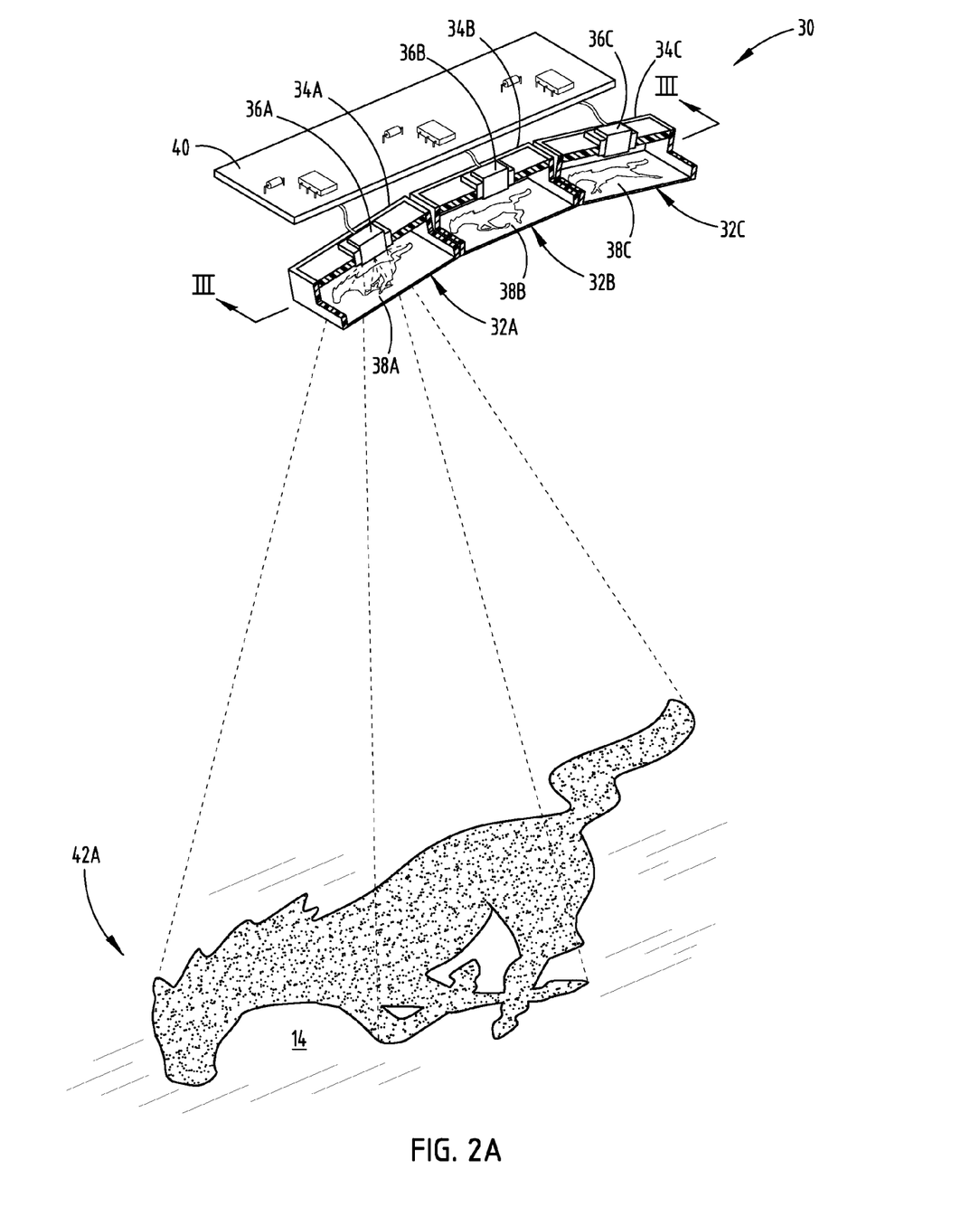
FIG. 2A is an enlarged view of the lamp assembly illustrating the projection of a first lighted image with the first projector.
Figure 2B:
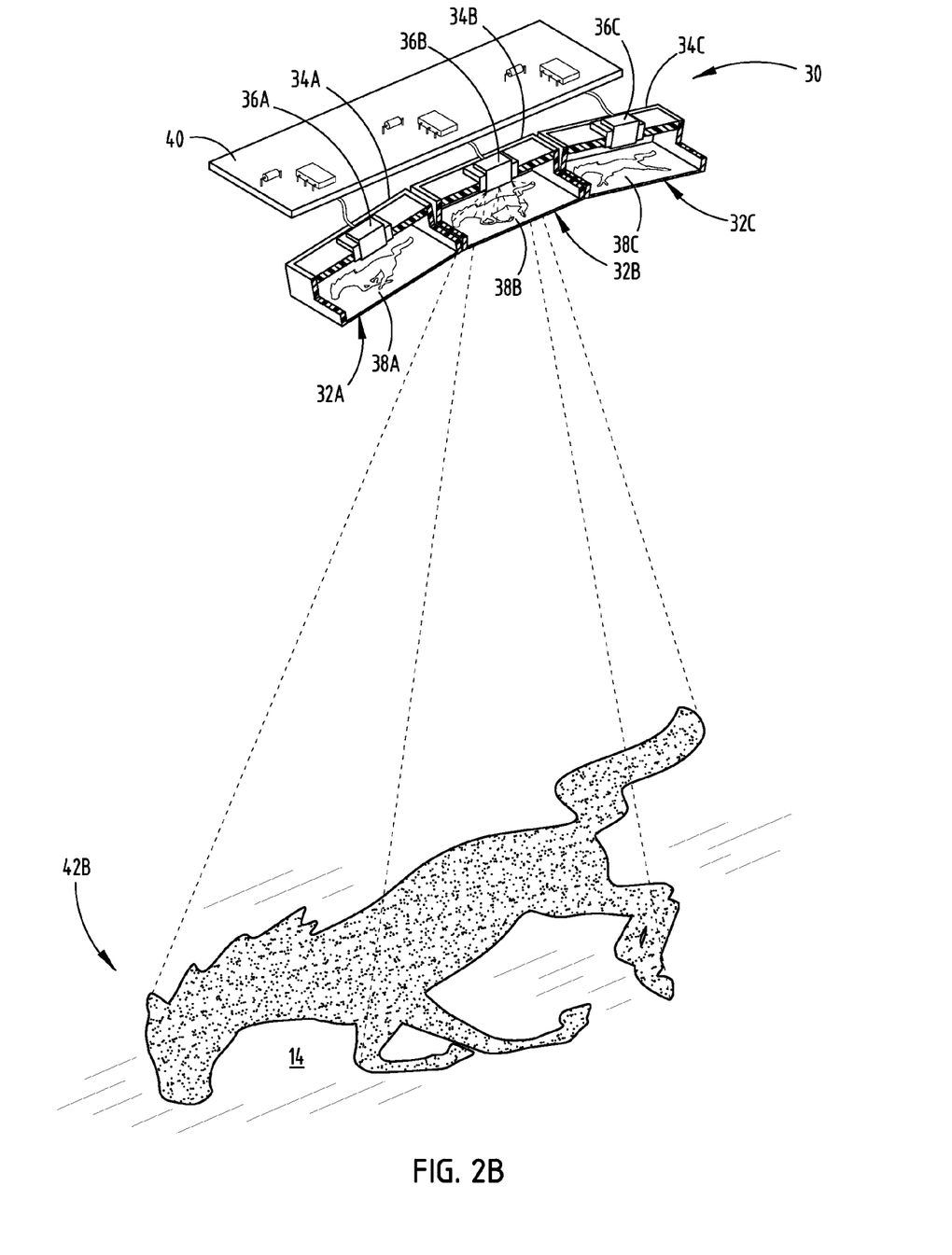
FIG. 2B is an enlarged view of the lamp assembly illustrating the projection of a second lighted image with the second projector.
Figure 2C:
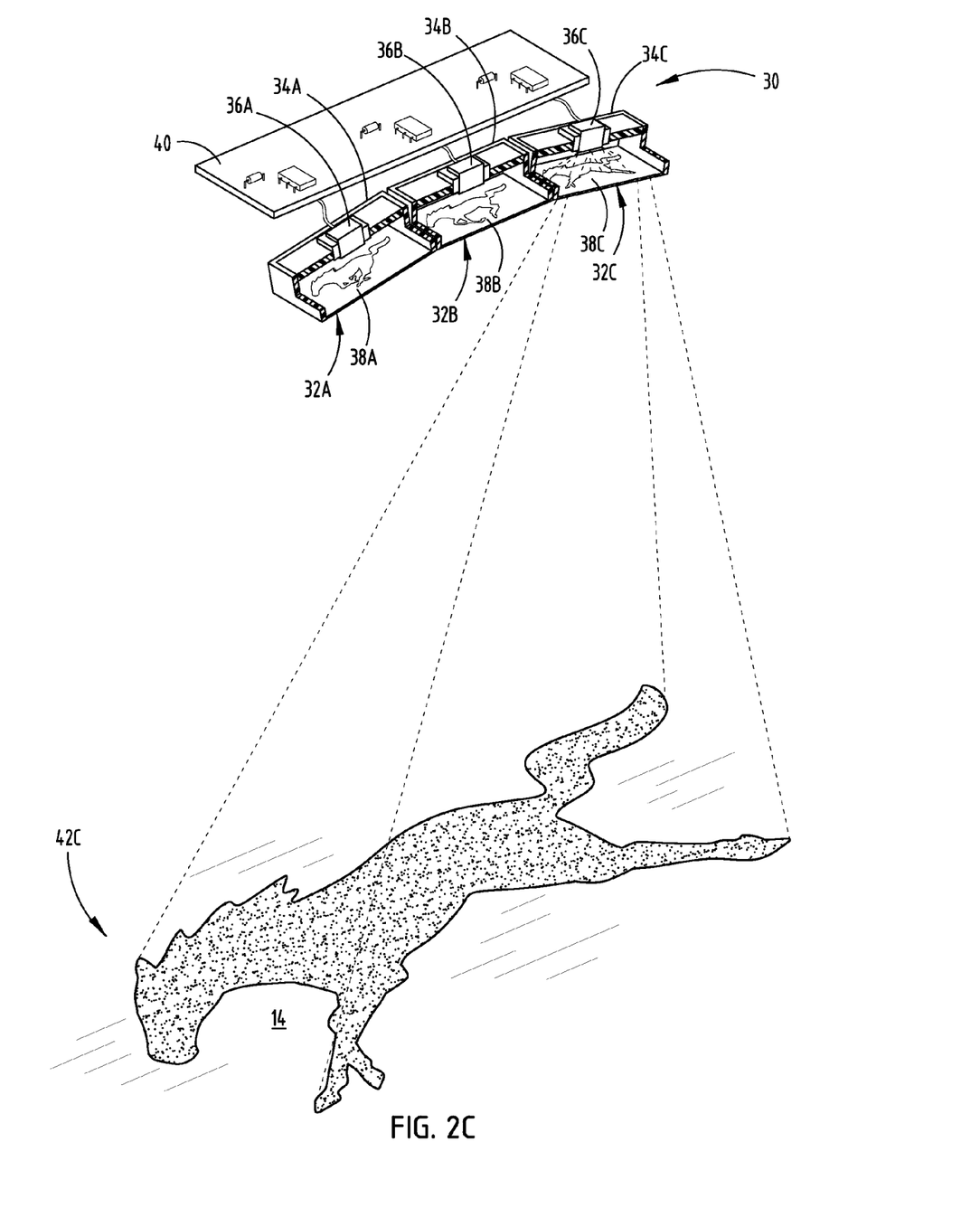
FIG. 2C is an enlarged view of the lamp assembly illustrating the projection of a third lighted image with the third projector.
Figure 3:
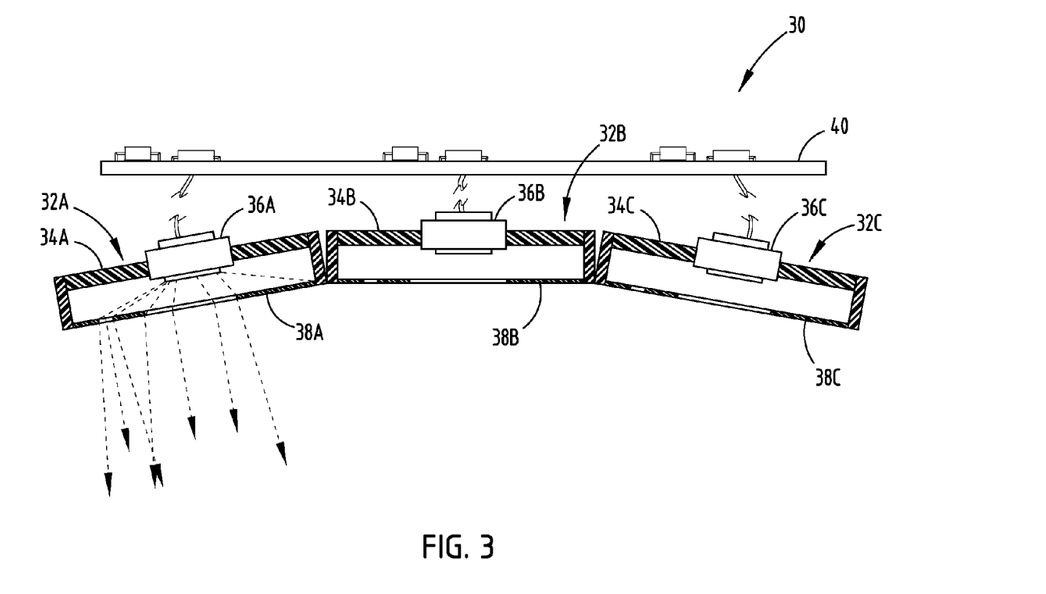
FIG. 3 is a cross-sectional view taken through line III-III of FIG. 2 further illustrating the light projectors.
Figure 4A:
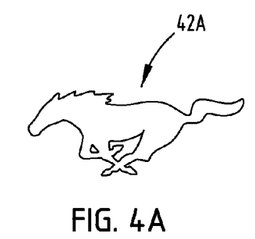
FIGS. 4A-4C are images of three different lighted image patterns generated by the three light projectors, according to one embodiment.
Figure 4B:
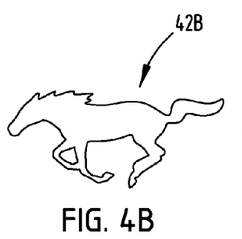
Figure 4C:
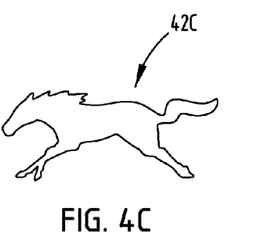

In FIG. 2A, the first light projector 32A is shown activated such that the first light source 36A illuminates light onto first image filter 32A to generate a first lighted image pattern 42A on ground surface 14. In FIG. 2B, the second light projector 32B is shown activated such that the second light source 36B illuminates light onto the second image filter 38B to generate a second lighted image pattern 42B on ground surface 14. In FIG. 2C, the third light projector 32C is shown activated such that third light source 36C generates a beam of light onto the third image filter 38C to generate a third lighted image pattern 42C onto the ground surface 14. It should be appreciated that the light projectors 32A-32C are activated and deactivated one at a time in a successive sequence at a rapid rate to generate animated imaging. In doing so, each light projector may be turned on for an activation time period in the range of about 50 to 500 milliseconds, and more preferably 50 to 250 milliseconds, and then turned off and the next light projector turned on immediately so as to generate the appearance of a moving lighted image, such as an animated running mustang. The activation time period could be extended up to 1.5 seconds, according to embodiments that generate a slower moving image. The first, second and third lighted image patterns 42A-42C are further shown in FIGS. 4A-4C, respectively. With a sufficiently fast successive activation and deactivation of the light projectors, the mustang appears to be running as the legs as viewed by a user appear to move.

Figure 5:
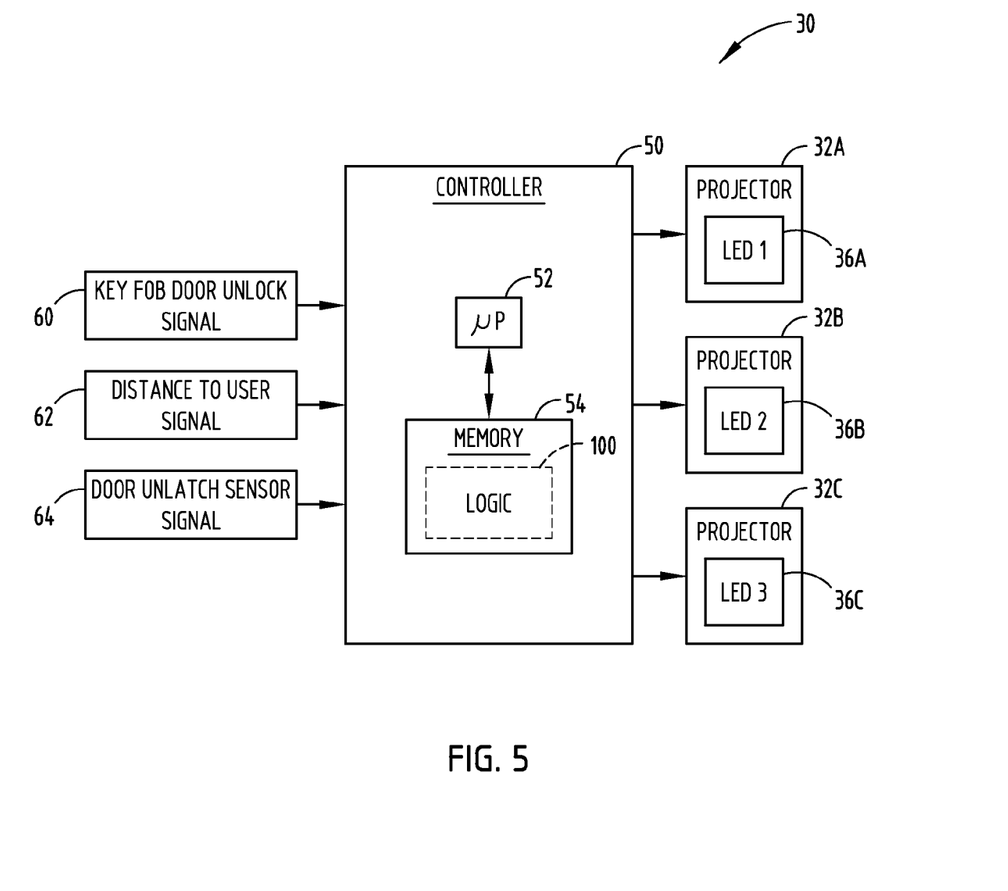
FIG. 5 is a block diagram further illustrating the puddle lamp assembly.

Referring to FIG. 5, the vehicle puddle lamp assembly 30 is further illustrated having a controller 50 receiving various inputs and controlling each of the first, second and third projectors 32A-32C, by applying signals to the light sources 36A-36C. The controller 50 may include a microprocessor 52 and memory 54 as illustrated, according to one embodiment. It should be appreciated that the controller 50 may include control circuitry such as analog and/or digital control circuitry. Stored within memory 54 and executed by a microprocessor 52 is logic 100 for processing the various inputs and controlling each of the plurality of light projectors as described herein. The inputs to the controller 50 may include a key fob door unlock signal 60 which may be made available from another controller, e.g., body control module, within the vehicle in communication with the key fob via wireless communication. Additionally, the controller 50 receives a distance to user signal 62 which is a distance that the user is detected from the vehicle. The distance to the user signal may be generated by computing distance between the vehicle and the key fob, according to one embodiment. Another controller such as a vehicle body control module may supply the distance to user signal. According to other embodiments, the distance to the user signal could be generated using other sensors, such as an ultrasonic proximity sensor. The controller 50 further receives a door unlatch sensor signal 64. The door unlatch sensor signal may be a signal sensed by the proximity sensor in the door handle, or may be a signal detected by activation of a sensor on the key fob.

The controller 50 processes the inputs and activates the lamp assembly 30 when the key fob door unlock signal 60 is received by turning the plurality of light projectors sequentially on and off one at a time. The controller 50 may activate the lamp assembly 30 in response to other signals such as a door unlock signal generated by a door mounted switch or a door open signal, according to other embodiments. The lamp assembly 30 may be turned off when a predetermined time period expires or when a user is detected opening a vehicle door via the door unlatch sensor signal 64 according to one embodiment. The controller 30 may further determine a distance from the vehicle to a user and may control intensity and/or time of activation for each of the light projectors, according to other embodiments.

Figures 6, 7:
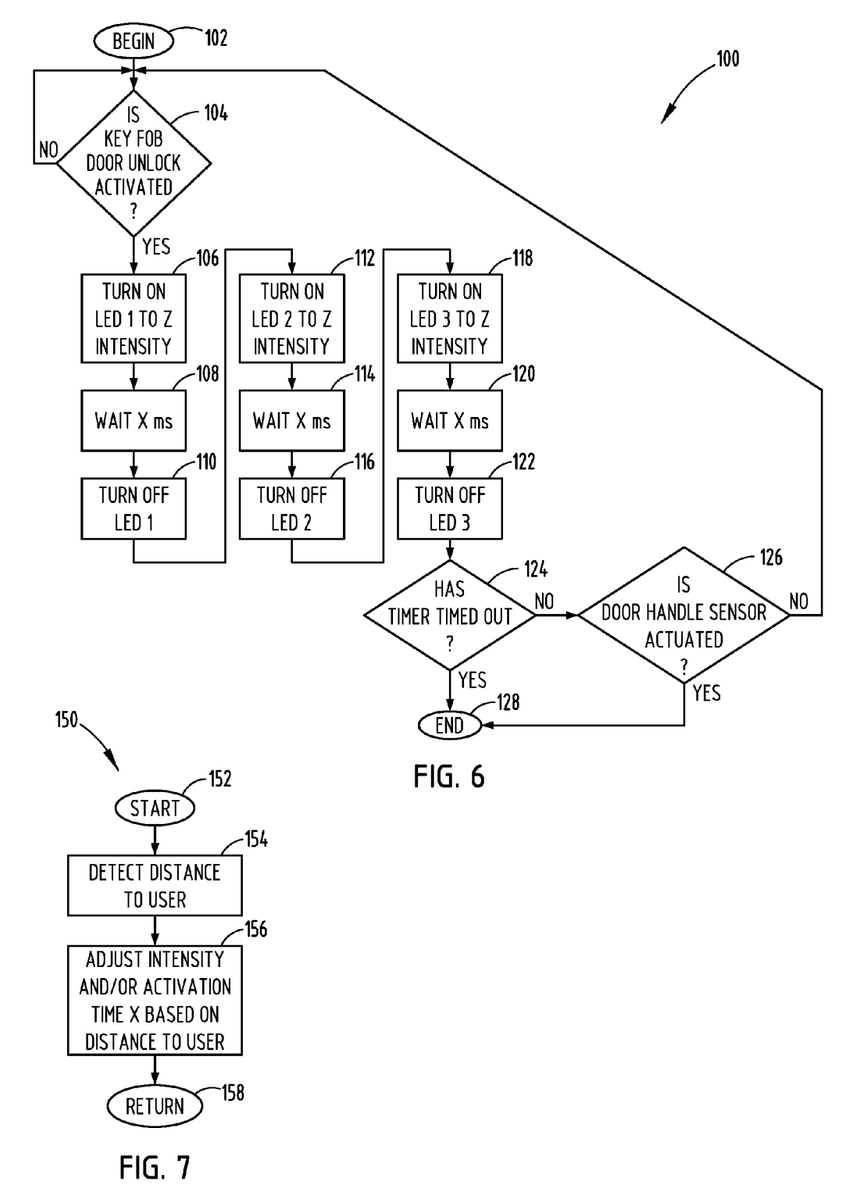
FIG. 6 is a flow diagram illustrating a method of controlling activation of the light projectors of the assembly, according to one embodiment.
FIG. 7 is a flow diagram illustrating a routine of adjusting intensity and/or activation time of the light projectors, according to another embodiment.

Referring to FIG. 6, the logic or method 100 of activating the vehicle puddle lamp assembly 30 is illustrated, according to one embodiment. Method 100 begins at step 102 and proceeds to decision step 104 to determine if the key fob door unlock button has been activated and, if not, returns. If the key fob door unlock button has been activated, method 100 proceeds to step 106 to turn on the first LED 1 to intensity Z, then proceeds to step 108 to wait for an activation time period of X milliseconds, before proceeding to step 110 to turn off the first LED 1. Accordingly, a first cycle of the first projector turning on and off is complete. Next, method 100 proceeds to step 112 to turn on the second LED 2 to an intensity Z, and then proceeds to step 114 to wait for an activation time period of X milliseconds, before turning off the second LED 2 at step 116. Thus, the second light projector has been turned on and off for a complete cycle. Next, method 100 proceeds to step 118 to turn on the third LED 3 to an intensity Z, and then proceeds to step 120 to wait for an activation time period of X milliseconds before turning off the third LED 3 at step 122. At this point, a cycle of the third projector turning on and off is complete. Following successive sequential activations and deactivations of each of the first and second and third light projectors, method 100 proceeds to decision step 124 to determine if a timer has timed out since the key fob unlock was activated and, if so, ends at step 128. If the timer has not timed out, method 100 proceeds to decision step 126 to determine if the door handle sensor has been actuated and, if so, ends at step 128. If the door handle sensor has not been actuated, method 100 returns to step 104 to repeat the successive activations and deactivations of the plurality of light projectors.

Referring to FIG. 7, a method 150 for adjusting the intensity Z and/or activation time X of the light projectors of method 100 is provided, according to another embodiment. In this embodiment, method 150 begins at step 152 and proceeds to step 154 to detect a distance to the user. The distance may be detected by computing the distance between the vehicle and the key fob, according to one embodiment. According to other embodiments, proximity sensors, such as an ultrasonic sensor may be employed to detect a distance to a user. Based on the detected distance, method 150 proceeds to step 156 to adjust intensity Z and/or activation time X of the light projectors based on the distance to the user, before returning at step 158. Accordingly, as the user approaches the vehicle, the intensity of the lighted image pattern generated by each light projector may be increased and/or the speed at which the projector images are changed and the image appears to be moving may be increased. The intensity can thereby increase or decrease as the customer approaches or moves away from the vehicle. For example, if the customer is within fifty (50) feet of the vehicle, the image projectors may be turned on and activated at ten percent (10%) intensity and may ramp up to fifty percent (50%) intensity as the user moves to within a distance of twelve (12) feet of the vehicle, and then ramp to one hundred percent (100%) of the intensity as the user reaches a distance of five (5) feet from the vehicle. The X activation time may be changed to make the image appear to move at a faster or slower rate. The X activation time period may be shortened (decreased) to make the image to appear to move faster as the user approaches the vehicle and may be extended (increased) as the user moves further away from the vehicle, according to one example.

Accordingly, the vehicle puddle lamp assembly 30 advantageously provides light illumination in a region to the side of the vehicle door to allow enhanced access lighting. The lamp assembly 30 generates an animated image which gives the appearance of a moving lighted image on the ground surface adjacent to the vehicle to provide an aesthetically pleasing light illumination. It should be appreciated that the puddle lamp assembly 30 may be employed on opposite lateral sides of the vehicle as well as other locations on the vehicle to provide light illumination and a lighted animated image.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle puddle lamp assembly comprising:
   a plurality of light projectors located on a vehicle and configured to illuminate different lighted image patterns on a surface adjacent to the vehicle;
   a sensor sensing a distance between the vehicle and a user; and
   a controller sequentially activating the plurality of light projectors to generate an animated lighted image on the surface and adjusting intensity of the plurality of light projectors and speed at which the animated image changes based on the sensed distance.

2. The lamp assembly of claim 1, wherein the controller turns the plurality of light projectors on and off one projector at a time.

3. The lamp assembly of claim 2, wherein the controller turns one of the light projectors on for a time period in the range of 50 to 500 milliseconds.

4. The lamp assembly of claim 1, wherein the plurality of light projectors comprises first, second and third projectors, each comprising a light source and a filter operatively coupled to the light source for generating the image pattern.

5. The lamp assembly of claim 1, wherein the plurality of light projectors are located in a vehicle exterior side view mirror for generating lighted image patterns on a ground surface adjacent to a vehicle door.

6. The lamp assembly of claim 1, wherein each of the plurality of light projectors comprises a light source and a filter comprising an image pattern located in front of the light source.

7. The lamp assembly of claim 1, wherein the controller activates the light projector in response to a control signal and further deactivates the light projectors when an occupant is sensed opening a door of the vehicle.

8. The lamp assembly of claim 7, wherein the control signal is generated in response to a door open signal.

9. The lamp assembly of claim 1, wherein the controller controls the speed at which the animated lighted image changes by controlling a time of activation of each of the light projectors based on the sensed distance.

10. A method of generating an animated lighted image with a vehicle puddle lamp assembly, comprising:
    receiving a signal to activate a vehicle puddle lamp;
    determining distance between the vehicle and a user;
    sequentially activating a plurality of light projectors configured to illuminate different light patterns on a surface adjacent to the vehicle to generate the animated lighted image; and
    controlling speed at which the animated light image changes based on the sensed distance.

11. The method of claim 10 further comprising the step of sensing an occupant in contact with the vehicle and deactivating the plurality of light sources when the occupant is sensed.

12. The method of claim 10, wherein the step of sequentially activating the plurality of light projectors comprises turning the plurality of light projectors on and off one projector at a time.

13. The method of claim 12, wherein the step of sequentially activating the plurality of light projectors comprises turning one of the light projectors on for a time period in the range of 50 to 500 milliseconds.

14. The method of claim 10, wherein the plurality of light projectors comprises first, second, and third light projectors, each comprising a light source and a filter operatively coupled to the light source for generating the image pattern.

15. The method of claim 10, wherein the plurality of light projectors are located on a vehicle exterior side view mirror for generating lighted image patterns on a ground surface adjacent to a vehicle door.

16. The method of claim 10, wherein the step of receiving a signal comprises receiving a vehicle door open signal generated by a key fob.

17. The method of claim 10 further comprising the step of controlling intensity of light illuminated by each of the plurality of light projectors based on the sensed distance.

18. A vehicle puddle lamp assembly comprising:
- a plurality of light projectors located on a vehicle and configured to illuminate different lighted image patterns on a surface adjacent to the vehicle;
- a sensor sensing distance between the vehicle and a user; and
- a controller sequentially activating the plurality of light projectors to generate an animated lighted image on the surface and adjusting speed at which the animated lighted image changes based on the sensed distance.

19. A method of generating an animated lighted image with a vehicle puddle lamp assembly, comprising:
- receiving a signal to activate a vehicle puddle lamp;
- determining distance between the vehicle and a user;
- sequentially activating a plurality of light projectors configured to illuminate different light patterns on a surface adjacent to the vehicle to generate the animated lighted image; and
- controlling intensity of light illuminated by each of the plurality of light projectors and speed at which the animated image changes based on the sensed distance.

* * * * *

UNITED STATES PATENT AND TRADEMARK OFFICE
CERTIFICATE OF CORRECTION

PATENT NO. : 9,321,395 B2  
APPLICATION NO. : 13/871065  
DATED : April 26, 2016  
INVENTOR(S) : Ali Ammar et al.

It is certified that error appears in the above-identified patent and that said Letters Patent is hereby corrected as shown below:

In the Claims  
Column 6, claim 10, line 40;  
"light" should be -- lighted --.

Signed and Sealed this  
Nineteenth Day of July, 2016

Michelle K. Lee  
*Director of the United States Patent and Trademark Office*